July 12, 1927.

A. J. MICHELIN

VEHICLE WHEEL

Filed April 16, 1920

Inventor:
A. J. Michelin.
by Wilkinson + Giusta,
Attorneys.

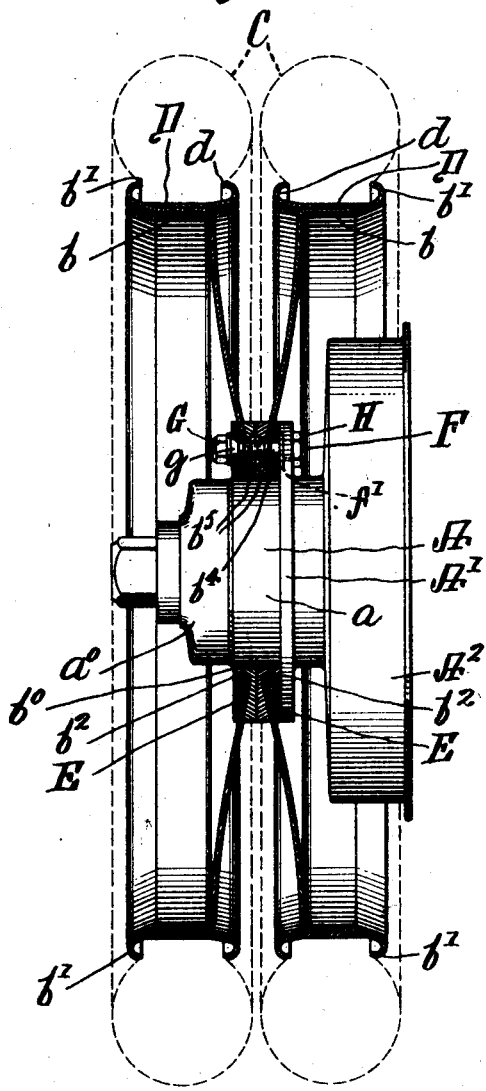
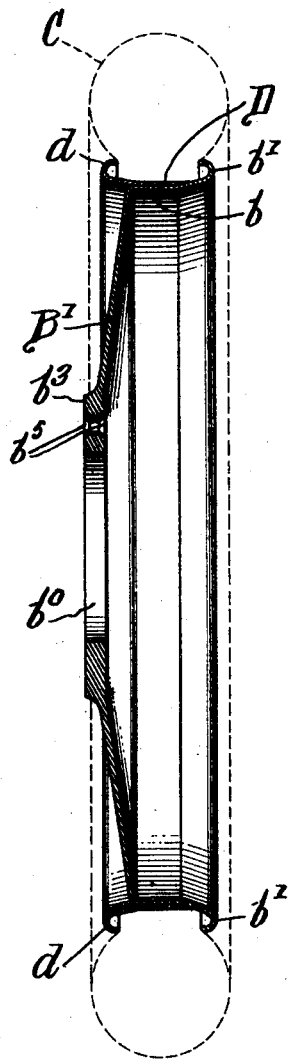

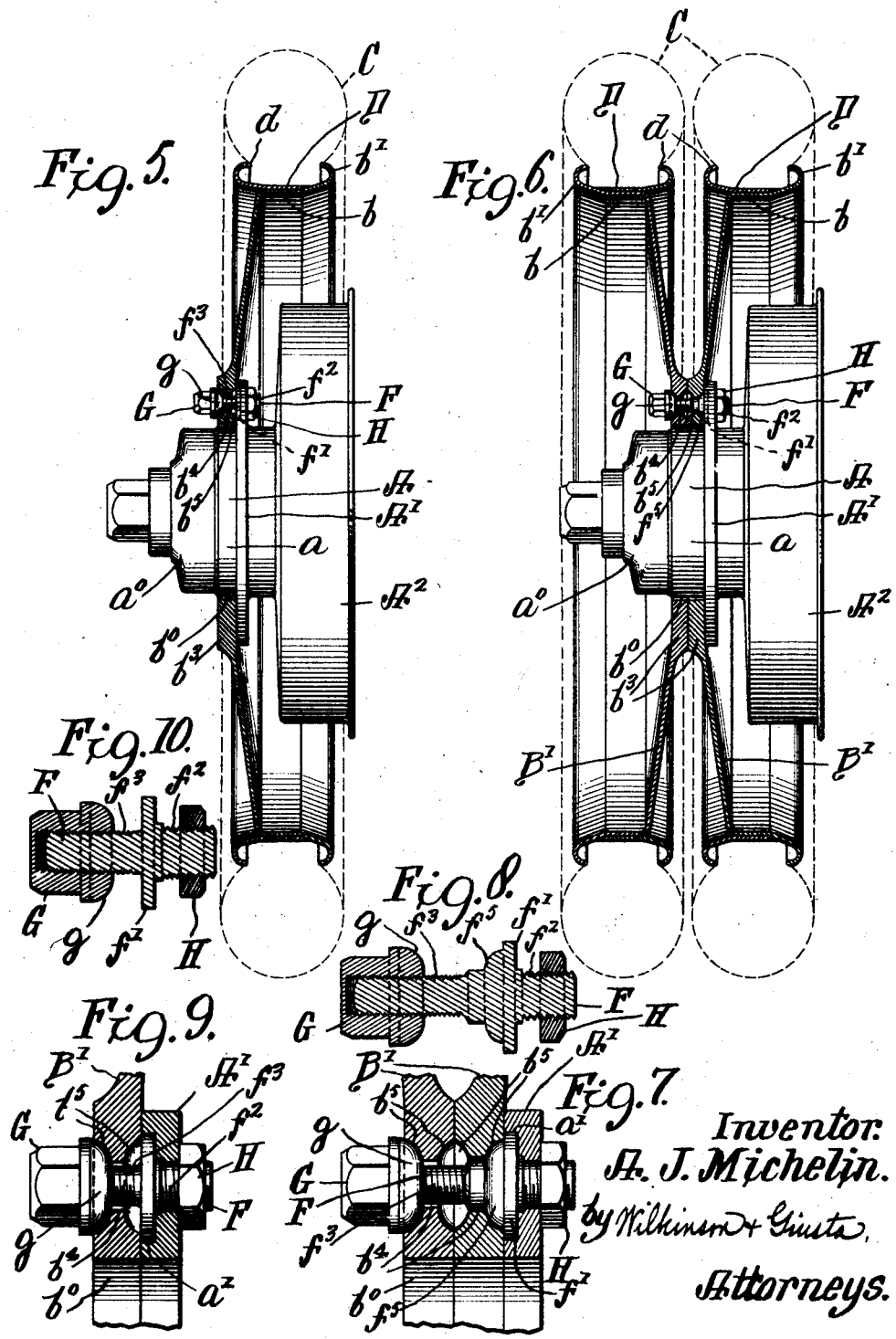

Patented July 12, 1927.

1,635,894

UNITED STATES PATENT OFFICE.

ANDRÉ JULES MICHELIN, OF PARIS, FRANCE.

VEHICLE WHEEL.

Application filed April 16, 1920, Serial No. 374,505, and in France December 8, 1913.

My present invention relates to improvements in vehicle wheels, and more especially to vehicle wheels for use with pneumatic, rubber, or other resilient tires, such as are used on automobiles, auto trucks, and the like.

The invention consists primarily in providing a wheel with a detachable annular web plate adapted to carry on its outer periphery the tire, and adapted to be detachably connected near its inner periphery to the hub of the wheel.

The web plate is preferably made of resilient metal, such as steel, and is dished axially so as not only to secure a suitable resiliency of the metal plate against axial strains, but also to enable the web plates carrying the tires to be mounted in pairs, side by side, on the same hub of a wheel, if desired.

The annular web plate may be formed of a sheet of uniform thickness, but it is preferably reinforced at or near its inner periphery. The outer periphery of the web plate is bent over to form a laterally projecting flange which may be so shaped as to form part of the rim carrying the tire, if desired.

The web plate is detachably connected to the hub by suitable fastening devices, such as bolts and nuts, so that the said web plate, either with or without the tire thereon, may be readily applied to or removed from the hub of the wheel, as may be desired.

My invention will be more fully understood after reference to the accompanying drawings, in which like parts are indicated by similar reference symbols throughout the several views, and in which:—

Figure 3 is a similar view to Figure 1, but shows a pair of web plates and tires mounted on the same hub of the wheel.

Figure 4 shows a modification in which the web plate is thickened near its inner periphery.

Figure 5 is a similar view to Figure 1, but shows the web plate of Figure 4 attached directly to the hub.

Figure 6 is a similar view to Figure 3, but shows a pair of web plates of the character shown in Figures 4 and 5 mounted on the same hub of the wheel.

Figure 7 is a detail view showing on a larger scale the means for fastening the two disks to the hub of the wheel shown in Figure 6.

Figure 8 is a detail showing a section through the bolt and nuts shown in Figures 6 and 7.

Figure 9 is a detail view on a somewhat larger scale showing the fastening arrangement of Figure 5; and Figure 10 shows a section through the bolt and nuts used in Figures 5 and 9.

Throughout the several views A represents the hub of the wheel which is preferably of the usual form, and is provided with a flange or collar A' to which the web plate is attached. This hub is shown as provided with the usual brake drum $A^2$, but this is not a part of the invention, and any convenient form of hub provided with a suitable flange or collar may be used in connection with the invention which relates more particularly to the removable wheel. This wheel consists of the web plate, means for attaching the web plate to the hub of the wheel, and means for attaching the tire to the outer periphery of the web plate, as will now be more fully described.

Figure 1:
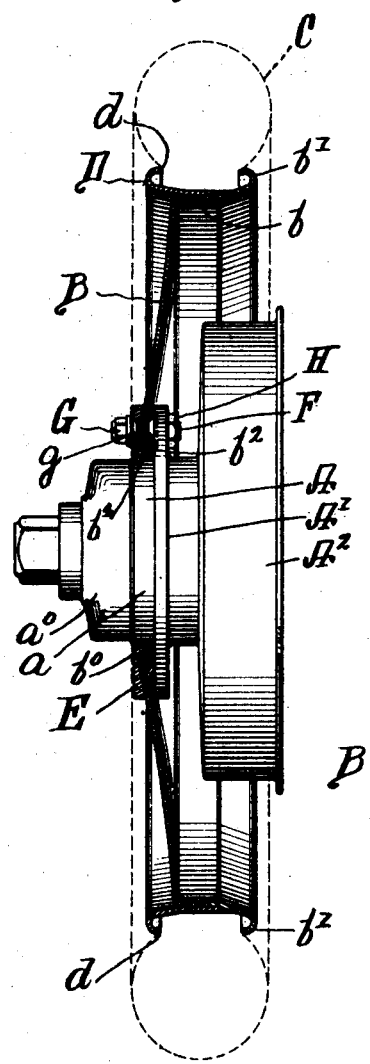
Figure 1 shows a section through a complete wheel constructed according to my invention, with the hub and brake drum in elevation, and the tire in dotted lines
Figure 2:
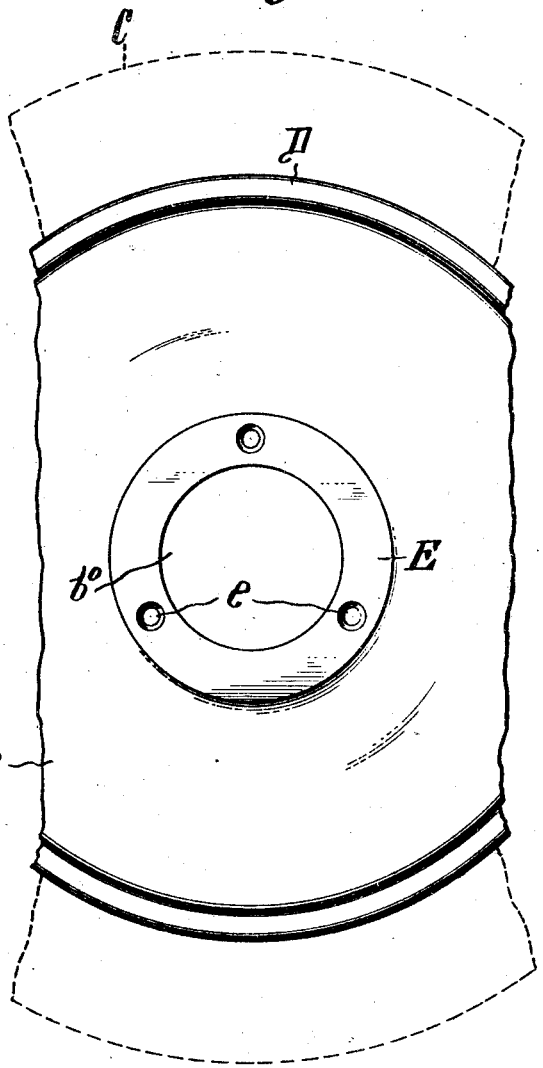
Figure 2 is a side elevation of the detachable section of the wheel shown in Figure 1, the tire being also shown in dotted lines.

Referring first to Figures 1 to 3, B represents a web plate made of an annular disk of metal having the outer end flanged over to form, as at $b$, a ring, hook-shaped in cross section, as at $b'$, to form a part of the rim engaging the tire C shown in dotted lines. The other part of the rim is made of a separate piece of rolled metal D, having its edge bent over to form a hook $d$ to engage a tire of the clincher type.

This plate D is secured to the web plate B in any convenient way, as by soldering, welding, rivets or the like. The inner edge of the web plate B is flanged over, as at $b^2$, and is embedded in an annular casting E which serves as a bearing ring for attaching the wheel to the collar of the hub. This bearing ring is provided with perforations $e$, of a suitable number, to receive the fastening bolts F, which pass through the ring, the web plate held therein, and the collar A'; said bolts being held in place by suitable nuts, as will be hereinafter more fully described.

While I have shown three sets of perforations adapted for use with three securing bolts, it will be obvious that the number of such perforations and corresponding bolts may be varied at will.

The web plates B are preferably made substantially in the form of a flattened frustum of a cone, but the elements of the cone are not true straight lines, the angle of the cone being slightly greater near the apex than towards the base, as shown most clearly in Figures 1 to 3. This shape not only provides a certain amount of elasticity to the wheel, which would be lacking if the web plate were at right angles to the axis of the hub, but it also permits the wheel to be so arranged that the plane comprising the axis of the tire may be thrown either outside or inside, relative to the body of the vehicle, of that portion of the web plate attached to the hub.

This arrangement not only permits a single wheel to be mounted further out or closer to the body of the vehicle, as may be desired, but it has special advantages where it is desired to mount the removable wheels in pairs on the same hub, as shown in Figures 3, 6 and 7.

In the modification shown in Figure 4, which is incidentally also shown in Figures 5, 6, 7 and 9, instead of having the inner edges of the web plate reinforced by an annular casting, as shown in Figures 1 to 3, I form the inner periphery of the web plate B' of greater thickness, as shown at $b^3$, and I taper the thickness of the metal of the web plate from this portion $b^3$ outwards, thus providing not only a bearing for the fastening bolts, but also providing greater thickness and consequent rigidity of the metal near the hub, and more elasticity and less weight towards the periphery of the web plate.

The advantages gained by this reduced metal construction towards the periphery are not only greater elasticity towards the periphery, already described, but the maximum resistance to loads on the entire structure with the minimum weight, and also by having the parts of the periphery of the wheel lighter, there is a noticeable advantage of diminishing the gyroscopic action of the wheel due to the decrease in the weight of the metal at the periphery, where the lineal speed is, of course, greater than near the hub.

The web plate B' may be in the form of a true truncated cone, as indicated, or the elements may be pressed in to form a curve, as shown in Figures 1 to 3. Preferably these elements should be curved, as shown in Figures 1 to 3.

In order to conveniently assemble the wheel on the hub, or to remove the same therefrom, the hub is preferably provided with an annular shoulder or shelf $a^0$, of a slightly more reduced diameter than the periphery $a$ of the hub proper, and moreover the central opening $b^0$ in the web plate should be slightly larger than the maximum diameter of the periphery $a$ of the hub proper, so that the wheel may be slipped freely on and off; the clearance for this purpose being quite appreciable.

In order to prevent rattling, and to form a snug and firm joint, the collar on the hub and the bearing of the web plate for the bolts are provided with concave sockets, preferably in the form of zones of spheres, to engage corresponding bosses on the fastening bolts and nuts, as shown most clearly in Figures 7 to 10, in which the construction and operation of the means for fastening the web plate or web plates to the collar of the hub are shown.

Referring first to Figures 7 and 8, the two web plates B' are perforated, as at $b^4$, to provide clearance for the easy insertion and removal of the fastening bolt F, and these plates are provided on each side with spherical sockets $b^5$. The bolt F is shown as provided with a boss $f^5$ in the form of a zone of a sphere, to engage in the corresponding socket of the adjacent web plate, and the nut G has a similar spherical boss $g$ to engage in the corresponding socket $b^5$ of the other web plate B'.

The bolt F is shown as provided with an annular flange $f'$ to engage in an annular socket $a'$ in the collar A'. The end $f$ of the bolt, which passes through the collar A', is screw-threaded, as at $f^2$, to engage the nut H; which end $f^2$ of the bolt may be of larger diameter, if desired, than the opposite end $f^3$ of the bolt, which is screw-threaded to engage the nut G.

The nut G is preferably formed cup-shaped, as shown, to protect the screw threads as far as practicable from foreign matter, such as mud, water, or the like. It will be noted that when the nuts H and G are set up tight, the web plates B' will be firmly pressed together, and will be supported on the spherical surfaces $f^5$ and $g$ as bearings, being held clear of the circumference of the hub of the wheel. Any angular motion of the web plate relative to the hub of the wheel will be prevented by the fastening bolts F engaging in the collar A'. Thus it will be noted that this web plate will be entirely clear of the hub of the wheel when secured in place, but will find a supporting bearing on the bosses $f^5$ and $g$. There will also be a clearance between the web plates and the fastening bolts, so that the web plates can be quickly withdrawn from the fastening bolts after the nuts G are removed, and quickly slipped off of the hub of the wheel, and also quickly assembled, and the nuts G may be quickly secured in place, thus centering the web plates relative to the hub of the wheel.

Where single web plates are used on the hub instead of being mounted in pairs, as shown in Figures 7 and 8, I may use the form of bolt shown in Figures 9 and 10, in which the boss $f^5$ is omitted; but it will be obvious that a bolt similar to that shown in Figures 7 and 8 may also be used for fastening on a single web plate, as shown in Figures 9 and 10.

Among the advantages of the construction herein described are the greater strength and durability over wheels with wooden spokes, generally in use at the date of my invention, and the fact that metal wheels are not likely to be affected by climatic conditions, such as continued use alternately on muddy roads, or in dry weather.

Moreover, by giving the wheels the dished shape, a certain amount of resiliency is imparted to the wheel which is not possessed by metal wheels having the webs at right angles to the axis of the hub. Furthermore, by having the thickness of the web plate tapering from the hub outwards, this resiliency is increased, and at the same time the gyroscopic effect of heavy rotating masses carried by the periphery of the wheel is in a measure obviated. By having the elements of the cone curved, as shown, instead of straight, greater strength for the same weight of metal is secured near the periphery of the wheel.

It will be noted that the metal wheel is of great simplicity, and can be readily adapted to all types of hub; its application not requiring any changes in the construction of the hub except attaching to the hub a collar or coupling plate of suitable size to receive the fastening bolts.

These and various other advantages of the herein described construction will suggest themselves to those skilled in the art.

It will be obvious that various modifications might be made in the herein described construction, and in the operation of the same which could be used without departing from the spirit of my invention; and I do not mean to limit the invention to such details except as particularly pointed out in the claims.

Having thus described my invention what I claim and desire to secure by Letters Patent of the United States is:—

1. A vehicle wheel comprising a hub, an annular dished web plate of resilient metal provided with a flanged periphery, and with a central annular reinforce integral therewith and adapted to slip freely over said hub, and means for detachably connecting the reinforced central portion of said web plate to said hub.

2. A vehicle wheel comprising a hub, an annular dished web plate provided with a flanged periphery, and with a central annular reinforce adapted to slip freely over said hub, said web plate being substantially in the form of a hollow truncated cone from its center to its periphery, and having the tapered surface of said cone concaved from the apex towards said periphery, and means for detachably connecting the reinforced central portion of said web plate to said hub.

3. A vehicle wheel comprising a hub, an annular dished web plate provided with a flanged periphery, and with a central annular reinforce adapted to slip freely over said hub, said web plate being substantially in the form of a hollow truncated cone from its center to its periphery, and having the tapered surface of said cone concaved from the apex towards said periphery, said web plate being also of decreasing thickness from its reinforced central portion to its periphery, and means for detachably connecting the reinforced central portion of said web plate to said hub.

4. A vehicle wheel comprising a hub having an annular collar thereon, with bolt holes in said collar, an annular dished web plate provided with a flanged periphery, and with a central annular reinforce adapted to slip freely over said hub, said reinforced portion being provided with bolt holes registering with the bolt holdes on said collar and with concave sockets surrounding one end of said bolt holes, and means for detachably connecting the reinforced central portion of said web plate to said hub, comprising bolts passing freely through said bolt holes, nuts securing one end of said bolts to said collar, and nuts having convex bosses engaging in said concave sockets mounted on the other end of said bolts.

5. A vehicle wheel comprising a hub having an annular collar thereon, with bolt holes in said collar, an annular dished web plate provided with a flanged periphery, and with a central annular reinforce adapted to slip freely over said hub, said reinforced portion being provided with bolt holes registering with the bolt holes on said collar and with concave sockets surrounding one end of said bolt holes, said web plate being of decreasing thickness from its reinforced central portion to its periphery, and means for detachably connecting the reinforced central portion of said web plate to said hub, comprising bolts passing freely through said bolt holes, nuts securing one end of said bolts to said collar, and nuts having convex bosses engaging in said concave sockets mounted on the other end of said bolts.

6. In a vehicle wheel, the combination with a hub having an annular collar thereon, with bolt holes in said collar, a pair of annular dished web plates each provided with a flanged periphery, and with a central annular reinforce adapted to slip freely over said hub, said reinforced portion being also provided with bolt holes registering with the bolt holes on said collar and with concave sockets surrounding the ends of said bolt holes, and means for detchably connecting the reinforced central portion of said web plates to said hub, comprising bolts passing freely through said bolt holes, and having convex bosses thereon to engage the adjacent web plate, nuts securing one end of said bolts to said collar, and nuts having convex bosses engaging in said concave sockets mounted on the other end of said bolts.

7. A vehicle wheel comprising a hub having an annular flange, a plurality of screw-threaded bolts carried by said flange, an annular web plate provided with a plurality of perforations through which said bolts extend, said web plate having portions thereof depressed, and means for detachably connecting said web plate to said hub comprising tapered nuts threaded on said bolts and cooperating with and adapted to seat in said depressed portions.

8. A vehicle wheel comprising a hub having an annular flange, a plurality of screw-threaded bolts carried by said flange, an annular dished web plate provided with a plurality of concave sockets centrally perforated and positioned at equal distances from the center of said plate, and means for detachably connecting said web plate to said hub comprising nuts threaded on said bolts and having convex bosses engaging in said concave sockets.

9. A vehicle wheel comprising a hub having an annular flange, a plurality of screw-threaded bolts carried by said flange, an annular dished web plate, decreasing in thickness from its central portion to its periphery, provided with a plurality of concave sockets centrally perforated and positioned at equal distances from the center of said plate, and means for detachably connecting said web plate to said hub comprising nuts threaded on said bolts and having convex bosses engaging in said concave sockets.

10. A vehicle wheel comprising a hub having an annular flange, a plurality of screw-threaded bolts carried by said flange, each having a convex boss, a pair of annular dished web plates each provided with a central opening through which the hub extends and a plurality of concave sockets centrally perforated and positioned at equal distances from the center of said plate, said plates being reversely mounted on said hub with said bolts extending through the perforations of said sockets and the convex bosses on said bolts engaging in the sockets of the adjacent web plate, and means for detachably connecting said web plates to said hub comprising nuts threaded on said bolts and having convex bosses engaging in the concave sockets of the outer web plate.

11. A vehicle wheel comprising a hub, and an annular dished web plate of resilient metal provided with a flanged periphery, and with a central annular reinforce permanently connected with said web plate and adapted to slip freely over said hub, and means for detachably connecting the reinforced central portion of said web plate to said hub.

12. A vehicle wheel comprising a hub, an annular dished web plate provided with a central annular reinforce adapted to slip freely over said hub, said web plate being of decreasing thickness from its reinforced central portion to its periphery, and means for detachably connecting the reinforced central portion of said web plate with said hub.

13. A demountable wheel construction comprising a hub having a radially extending flange, a plurality of threaded studs carried by said flange and extending parallel to the axis of said hub, a wheel body adapted to be detachably secured to said hub and including a metal portion adapted to lie against said flange, and securing nuts on said studs, the metal portion and the nuts having complemental and re-entrant face engagements with each other.

14. In a vehicle wheel, a web plate provided with a peripheral flange having laterally and outwardly projecting portions, and a rim member abutting against said outwardly projecting portion.

15. In a vehicle wheel, a web plate provided with a peripheral flange having laterally and outwardly projecting portions, and a rim member seating on said laterally projecting portion and abutting against said outwardly projecting portion.

16. In a vehicle wheel, a web plate provided with a peripheral flange having laterally and outwardly projecting portions, and a rim member seating on said laterally projecting portion and abutting against said outwardly projecting portion, said flange being provided with an extension from the outwardly projecting portion completing the rim.

17. In a vehicle wheel, the combination with a hub, of a pair of annular dished web plates each provided with a flanged periphery, and with a central annular reinforce adapted to slip freely over said hub, the plates being reversely mounted on said hub, and means for detachably connecting the reinforced central portions of said web plates to said hub.

18. In a vehicle wheel, the combination with a hub, of a pair of annular dished web plates made of resilient metal and each provided with a flanged periphery, and with a central annular reinforce adapted to slip freely over said hub, the said plates being reversely mounted on said hub, and means for detachably connecting the reinforced central portions of said web plates to said hub.

19. A vehicle wheel comprising a hub having an annular flange, a plurality of screw-threaded bolts carried by said flange, each having a convex boss, a pair of annular dished web plates, each provided with a central opening through which the hub extends and a plurality of concave sockets centrally perforated and positioned at equal distances from the center of said plate, said plates being reversely mounted on said hub with said bolts extending through the perforations of said sockets and the convex bosses on said bolts engaging in the sockets of the adjacent web plate, and means for detachably connecting said web plates to said hub comprising nuts threaded on said bolts and having convex bosses engaging in the concave sockets of the outer web plate.

20. A wheel comprising a hub having a radial flange, a plurality of threaded studs carried by said flange, a pair of reversely disposed dished discs adapted to slip freely over said hub and provided with concave sockets perforated for the passage of said studs, nuts screwed on said studs and having convex faces seating in the corresponding sockets to clamp the discs against said flange, and a pair of tire-carrying rim structures, one mounted on the periphery of each disc.

21. A wheel comprising a hub having a radial flange, a plurality of threaded studs carried by said flange and each having a convex shoulder adjacent the flange, a pair of wheel discs adapted to slip freely over said hub and having concave sockets perforated for the passage of said studs, said discs being mounted on the hub with the convex shoulders of said studs engaging concave sockets on the innermost disc, nuts screwed on the ends of said studs and having convex faces engaging concave sockets on the outermost disc, and a pair of tire-carrying rim structures, one mounted on the periphery of each disc.

22. A wheel disc having a central opening, through which the wheel hub may extend, and a series of holes adapted to receive studs adjacent the central opening, said holes being positioned at equal distances from the center of the disc, said stud holes being countersunk at both ends to receive on either side a nut carried by said studs, whereby said disc may be attached to the hub from either side of the disc.

23. A wheel disc having a central opening, through which the wheel hub may extend, a peripheral flange, a thickened annular portion adjacent said central opening, and a series of stud holes through said annular portion positioned at equal distances from the center of the disc, said stud holes being countersunk at both ends, whereby the disc may be mounted on a hub in either of two positions.

24. A wheel comprising a hub having a radial flange, a plurality of threaded studs carried by said flange and having convex shoulders adjacent the flange, a wheel disc adapted to slip over said hub and perforated for the passage of said studs, and nuts screwed on the ends of said studs and clamping the disc against the flange.

25. A wheel comprising a hub having a radial flange, a plurality of threaded studs carried by said flange and having convex shoulders adjacent the flange, a wheel disc adapted to slip over said hub and having concave sockets perforated for the passage of said studs, said disc being mounted on the hub with the convex shoulders of the studs engaging said sockets, and nuts screwed on the ends of said studs and clamping the disc against said flange.

26. A wheel comprising a hub having a radial flange, a plurality of threaded studs carried by said flange, a wheel disc having a central opening through which the hub extends and perforated for the passage of said studs, an annular plate provided with a series of concave sockets perforated for the passage of said studs, said plate being mounted on the hub in engagement with the outermost side of said disc, and nuts screwed on the ends of said studs and seating in said sockets to clamp the disc against the flange.

27. A wheel comprising a hub having a radial flange, a plurality of threaded studs carried by said flange and having convex shoulders adjacent the flange, a wheel disc having a central opening, through which the hub extends, and perforated for the passage of said studs, an annular plate provided with a series of concave sockets perforated for the passage of said studs, said plate being mounted on the hub in engagement with the outermost side of said disc, and nuts screwed on the ends of said studs and engaging the concave sockets to clamp the disc against the flange.

28. In a vehicle wheel, a hub, a collar on the hub, a pair of wheel bodies, and a single annular series of axially extending threaded fastening devices connecting both wheel bodies to said collar, said fastening devices having a connection with said collar, and an enlarged and re-entrant face engagement with each of said wheel bodies.

29. In a vehicle wheel, a hub, a collar on the hub, a pair of wheel bodies, and a single annular series of axially extending bolts and nuts connecting both wheel bodies to said collar, which bolts are anchored to the collar, and which bolts and nuts combinedly have an enlarged and re-entrant face engagement with each of said wheel bodies 30. In a vehicle wheel, the combination with a hub, of a pair of relatively thin annular dished web plates of wrought metal having main bodies divergent from said hub, and means for detachably securing said plates to said hub, and rim structures supported directly from the peripheries of said web plates.

31. In a vehicle wheel, the combination with a hub, of a pair of relatively thin annular dished web plates of wrought metal having resilient main bodies divergent from said hub, but flattened central portions parallel to each other, a radial flange on the hub, and means for detachably securing the parallel faces of said web plates and said hub flange together in face to face engagement, together with a rim structure supported directly from the peripheries of said resilient web plates.

32. A wheel comprising a hub, a pair of dished web plates reversely mounted on said hub and diverging therefrom, means for detachably securing said plates to said hub, and a pair of rim structures one on the periphery of each plate and having its main body disposed outwardly of the diverging plates.

33. A vehicle wheel comprising a hub having an annular flange thereon, a relatively thin annular dished web plate of wrought metal having a resilient main body connected with said flange substantially in the plane of the wheel, and an annular series of axially extending complemental sockets and bosses between the flange and the web plate, and means detachably clamping the sockets and bosses together and connecting the plate and the flange together through the bosses and sockets.

34. A vehicle wheel comprising a hub having an annular flange thereon, a relatively thin annular dished web plate of wrought metal having a resilient main body and a central annular reinforce connected with said flange substantially in the plane of the wheel, and an annular series of axially extending complemental sockets and bosses between the flange and the web plate, and means detachably clamping the sockets and bosses together and connecting the plate and flange together through the bosses and sockets.

In testimony whereof, I affix my signature.

ANDRÉ JULES MICHELIN.